United States Patent
Ioffe (10) Patent No.: US 7,596,247 B2
(45) Date of Patent: Sep. 29, 2009

(54) METHOD AND APPARATUS FOR OBJECT RECOGNITION USING PROBABILITY MODELS

(75) Inventor: Sergey Ioffe, Mountain View, CA (US)

(73) Assignee: Fujifilm Corporation, Tokyo (JP)

( * ) Notice: Subject to any disclaimer, the term of this patent is extended or adjusted under 35 U.S.C. 154(b) by 788 days.

(21) Appl. No.: 10/734,258

(22) Filed: Dec. 15, 2003

(65) Prior Publication Data
US 2005/0105780 A1    May 19, 2005

Related U.S. Application Data

(60) Provisional application No. 60/519,639, filed on Nov. 14, 2003.

(51) Int. Cl.
*G06K 9/00* (2006.01)
(52) U.S. Cl. .............. 382/118; 340/5.53; 340/5.83
(58) Field of Classification Search ......... 382/115, 382/116, 117, 118, 305, 224, 226, 228; 340/5.53, 340/5.83
See application file for complete search history.

(56) References Cited

U.S. PATENT DOCUMENTS

| 6,873,713 B2* | 3/2005 | Okazaki et al. .............. 382/118 |
| 2002/0122596 A1* | 9/2002 | Bradshaw ................... 382/226 |
| 2004/0264780 A1* | 12/2004 | Zhang et al. ................ 382/224 |
| 2006/0187305 A1* | 8/2006 | Trivedi et al. ............... 348/169 |

OTHER PUBLICATIONS

Ralph et al. "Growing Gaussian Mixture Models for Pose invariant Face Recognition, IEEE, 2000, pp. 1088-1091".*
T.F Cootes et al. "View-Based Active Appearance Models", IEEE 2000, pp. 227-232.*
Roderick Murray-Smith, Daniel Sbarbaro, "Nonlinear adaptive control using nonparametric Gaussian process prior models", Copyright © 2002 IFAC).*
Blanz et al., 2003, "Face Recognition Based on Fitting a 3D Morphable Model" *IEEE Trans. onPattern Analysis & Machine Intelligence* 25(9):1063-1074.
Chen et al., 2000, "In Search of Illumination Invariants" *Proc. Conf. CVPR.*
Collins et al., 2000, "Logistic Regression, Adaboost and Bregman Distances", *Computational Learning Theory*, pp. 158-169.
Cootes et al., 1998, "Active Appearance Models", *Lecture Notes in Computer Science* 1407:484.

(Continued)

*Primary Examiner*—John B Strege
(74) *Attorney, Agent, or Firm*—Birch, Stewart, Kolasch & Birch, LLP (57) ABSTRACT

A method and an apparatus automatically recognize or verify objects in a digital image using probability models. According to a first aspect, a method and apparatus automatically recognize or verify objects in a digital image by: accessing digital image data including an object of interest therein; detecting an object of interest in the image; normalizing the object to generate a normalized object representation; extracting a plurality of features from the normalized object representation; and applying each feature to a previously-determined additive probability model to determine the likelihood that the object of interest belongs to an existing class. In one embodiment, the previously-determined additive probability model is an Additive Gaussian Model.

26 Claims, 6 Drawing Sheets

OTHER PUBLICATIONS

Cootes et al., 2000, "View-Based Active Appearance Models" *Proc. Intl. Conf. Automatic Face & Gesture Recognition*, pp. 227-232.

Cula et al., 2001, "Compact Representation of Bidirectional Texture Functions" *Proc. Computer Vision & Pattern Recognition* pp. 1041-1047.

Freund et al., 1996, "Experiments with a New Boosting Algorithm", *Intl. Conf. on Machine Learning*, pp. 148-156.

Georghiades et al., 2001, "From Few to Many: Illumination Cone Models for Face Recognition under Variable Lighting and Pose" *IEEE Trans. Pattern Analysis & Machine Intelligence* 23(6): 643-660.

Gross et al., 2002, "Eigen Light-Fields and Face Recognition Across Pose" *Proc. Intl. Conf Automatic Face & Gesture Recognition*.

Ioffe, S., 2003, "Red Eye Detection with Machine Learning" *Intl. Conf. on Image Processing*.

Julesz, B., 1981, "Textons, the Elements of Texture Perception, and Their Interactions", *Nature* 290(5802):91-97 (March).

Leung et al., 2001, "Representing and Recognizing the Visual Appearance of Materials Using Three-Dimensional Textons", *Int. J. Computer Vision* 43(1):29-44.

Murase et al., 1995, "Visual Learning and Recognition of 3-D Objection from Appearance", *Intl. J. on Computer Vision* 14(1):05-24.

Pentland et al., 1994. "View-Based and Modular Eigenspaces for Face Recognition", *Proc. of IEEE Conf. on Computer Vision & Pattern Recognition (CVPR '94)*, Seattle WA (June).

Phillips et al., 1998, "The Feret Database and Evaluation Procedure for Face-Recognition Algorithms", *Image & Vision Computing* 16(5):295-306.

Phillips et al., 2002, "Face Recognition Vendor Test 2002. Technical Report", *NIST*.

Schneiderman et al., 2000, "A Statistical Method for 3D Object Detection Applied to Faces and Cars", *IEEE Conf. on Computer Vision & Pattern Recognition* pp. 746-751.

Tenenbaum et al., 2000, "Separating Style and Content with Bilinear Models", *Neural Computation* 12(6):1247-1283.

Varma et al., 2002, "Classifying Images of Materials: Achieving Viewpoint and Illumination Independence" *Proc. Euro. conf. Computer Vision* pp. 255-271.

Vetter et al., 1997, "Linear Object Classes and Image Synthesis from a Single Example Image", *IEEE Transactions on Pattern Analysis and Machine Intelligence* 19(7):733-742.

Wiskott et al., 1997, "Face Recognition by Elastic Bunch Graph Matching", *PAMI* 19(7):775-779.

\* cited by examiner

Computing the Face Model:
Given X's (examples), compute the
posterior probability distribution
for Y.
(Do this for all features independently)

METHOD AND APPARATUS FOR OBJECT RECOGNITION USING PROBABILITY MODELS

CROSS-REFERENCE TO RELATED APPLICATION

This non-provisional application claims priority under 35 U.S.C. § 119(e) of U.S. Provisional Application No. 60/519,639 filed Nov. 14, 2003, the entire contents of which are hereby incorporated by reference.

BACKGROUND OF THE INVENTION

1. Field of the Invention

This invention relates to digital image processing, and more particularly to a method and apparatus for recognizing or verifying objects in a digital image using probability models.

2. Description of the Related Art

Face recognition is an increasingly important application of computer vision, particularly in areas such as security. However, accurate face recognition is often difficult due to the fact that a person's face can look very different depending on pose, expression, illumination, and facial accessories. Face recognition has been approached with 3D model based techniques and feature-based methods. The essential feature of every face recognition system is the similarity measure—where faces are considered similar if they belong to the same individual. The similarity measure can be used to verify that two face images belong to the same person, or to classify novel images by determining to which of the given faces the new example is most similar. However, designing a good similarity measure is difficult. Simple similarity measures such as those based on the Euclidean distance in pixel space do not typically work well because the image can be affected more by the intra-class variations (such as expression and pose) than by inter-class variations (due to differences between individuals). Therefore, a face recognition algorithm should be able to extract the image features that maximize the inter-class differences relative to the intra-class ones.

To make the best decision about the identity of a novel face example, an ideal system would have a representation of all the possible variations in appearance of each person's face—either as a model of the face and the environment, or as a large number of views of each face. If a large number of examples of each person are available in the gallery, then a model of each person can be computed and used to classify novel views of faces. However, in practice, the gallery may contain only a few examples of each person.

SUMMARY OF THE INVENTION

The present invention is directed to a method and an apparatus for automatically recognizing or verifying objects in a digital image. In one implementation, the present invention is directed to a method and an apparatus for automatically recognizing or verifying faces in digital images, such as digital photographs. According to a first aspect of the present invention, a method of automatically recognizing or verifying objects in a digital image comprises: accessing digital image data including an object of interest therein; detecting an object of interest in said digital image data; normalizing said object of interest to generate a normalized object representation; extracting a plurality of features from said normalized object representation; and applying each feature to a previously-determined additive probability model to determine the likelihood that the object of interest belongs to an existing class. In one embodiment, the previously-determined additive probability model is an Additive Gaussian Model that decomposes the appearance of an object into components corresponding to class (i.e., identity) and the view (pose, expression, etc.). In one implementation, the method classifies faces appearing in digital images based on previously-determined Additive Gaussian Models for a plurality of classes.

According to a second aspect of the present invention, an apparatus for automatically recognizing or verifying objects in a digital image comprises: an image data unit for providing digital image data; an object detection unit for detecting an object of interest in the digital image data; a normalizing unit for normalizing the object of interest to generate a normalized object representation; a feature extraction unit for extracting a plurality of features from the normalized object representation; and a similarity determining unit for applying each feature to a previously-determined additive probability model to determine the likelihood that the object of interest belongs to an existing class. In one embodiment of the present invention, the previously-determined additive probability model is an Additive Gaussian Model that decomposes the appearance of an object into components corresponding to class (i.e., identity) and the view (pose, expression, etc.). In one implementation, the method classifies faces appearing in digital images based on previously-determined Additive Gaussian Models for a plurality of classes.

BRIEF DESCRIPTION OF THE DRAWINGS

Further aspects and advantages of the present invention will become apparent upon reading the following detailed description taken in conjunction with the accompanying drawings, in which.

DETAILED DESCRIPTION

Aspects of the invention are more specifically set forth in the following description with reference to the appended figures. Although the detailed embodiments described below relate to face recognition or verification, principles of the present invention described herein may also be applied to different object types appearing in digital images.

Figure 1:
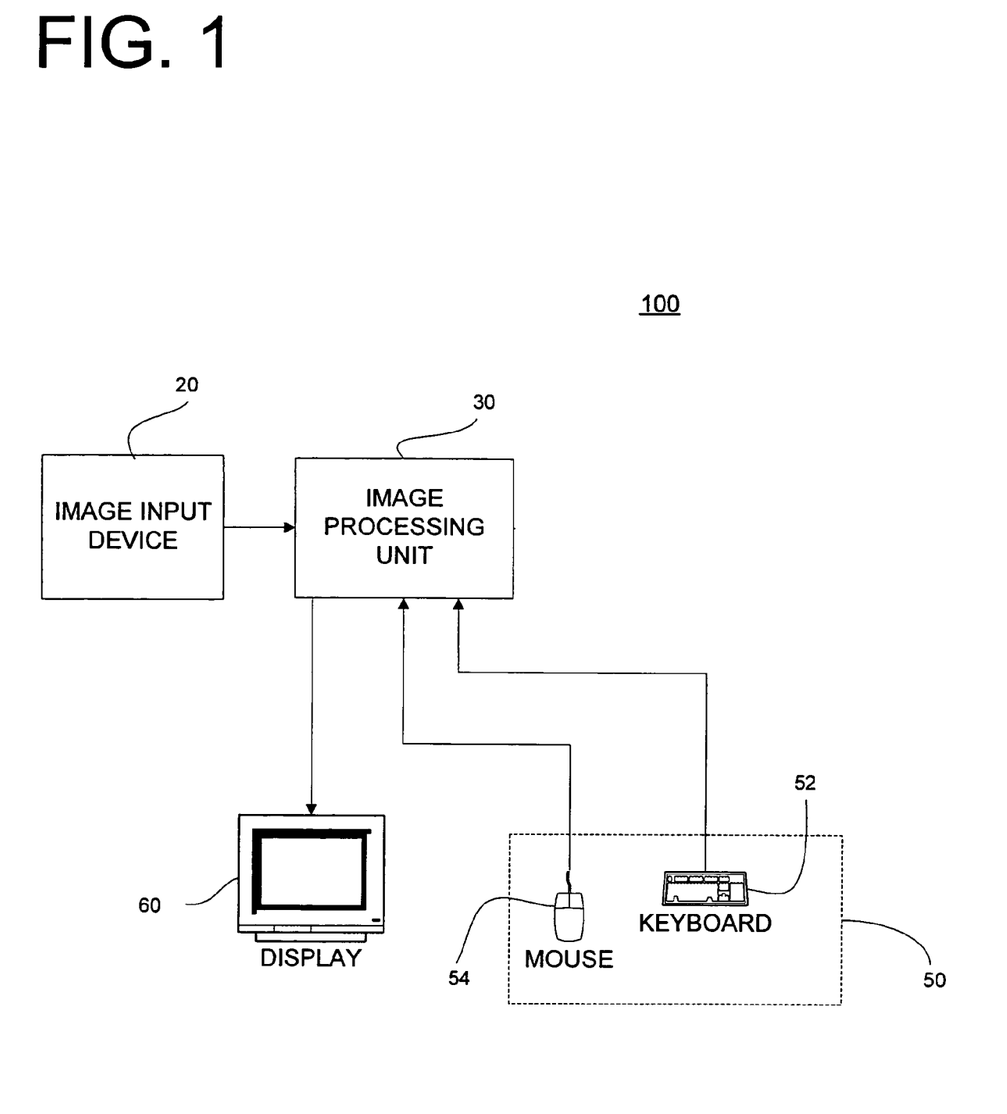
FIG. 1 is a block diagram of a system for performing object recognition/verification according to an embodiment of the present invention.

FIG. 1 illustrates a block diagram of a system for recognizing or verifying objects in a digital image according to an embodiment of the present invention. The system 100 illustrated in FIG. 1 includes the following components: an image input device 20; an image processing unit 30; a user input unit 50; and a display 60. Operation of and functional interaction between the components illustrated in FIG. 1 will become apparent from the following discussion.

In one implementation, the image input device 20 provides digital image data, e.g., representing a photograph containing an object of interest (e.g., a face). The image input device 20 may be a scanner for scanning images recorded on paper or film, e.g., including CCD sensors for photoelectronically reading R (red), G (green), and B (blue) image information from film or paper, frame by frame. The image input device 20 may be one or more of any number of devices for providing digital image data, e.g., a recording medium (a CD-R, floppy disk, etc.) or a network connection. The image processing unit 30 receives digital image data from the image input device 20 and performs object recognition/verification in a manner discussed in detail below. In the embodiment illustrated in FIG. 1, a user input includes a keyboard 52 and a mouse 54. In addition to performing object recognition in accordance with embodiments of the present invention, the image processing unit 30 may perform additional functions such as color/density correction, compression, etc.

Figure 2:
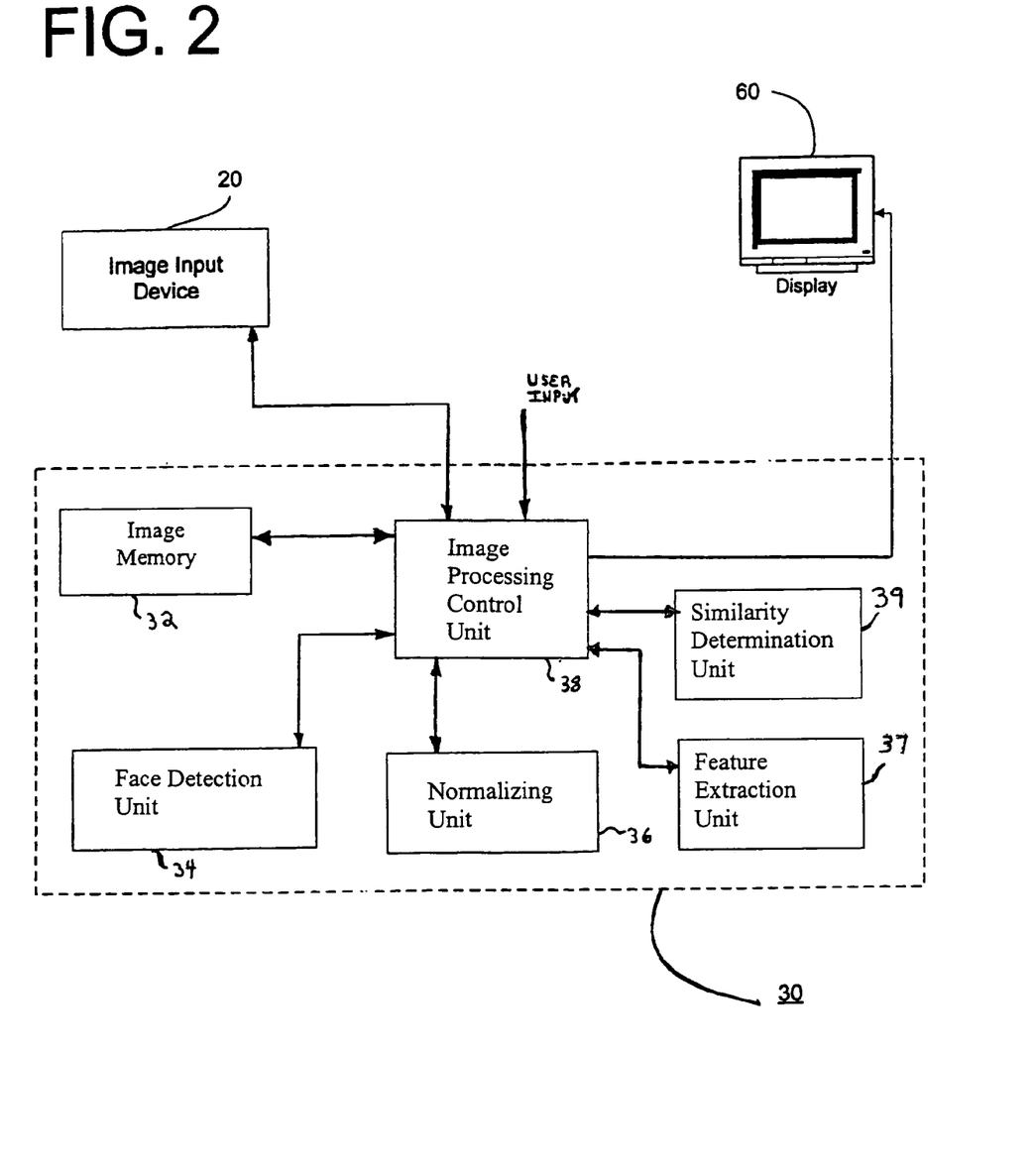
FIG. 2 is a block diagram illustrating in more detail aspects of the image processing unit of the system illustrated in FIG. 1 according to an embodiment of the present invention.

FIG. 2 is a block diagram illustrating in more detail the image processing unit 30 of the system illustrated in FIG. 1 according to an embodiment of the present invention that classifies or verifies faces appearing in a digital image. As shown in FIG. 2, the image processing unit 30 of this embodiment includes: an image memory 32; a face detection unit 34; a normalizing unit 36; a feature extraction unit 37; a similarity detection unit 38; and an image processing control unit 39. Although the various components of FIG. 2 are illustrated as discrete elements, such an illustration is for ease of explanation and it should be recognized that certain operations of the various components may be performed by the same physical device, e.g., by a microprocessor of a personal computer. Operation of the components of the image processing unit 30 will next be described with reference to FIGS. 3-8. Operation of the image processing unit 30 can generally be divided into two stages: (1) training; and (2) automatic object recognition/verification. The principles involved in both of these stages for an implementation of the present invention are described in detail below.

Figure 3:
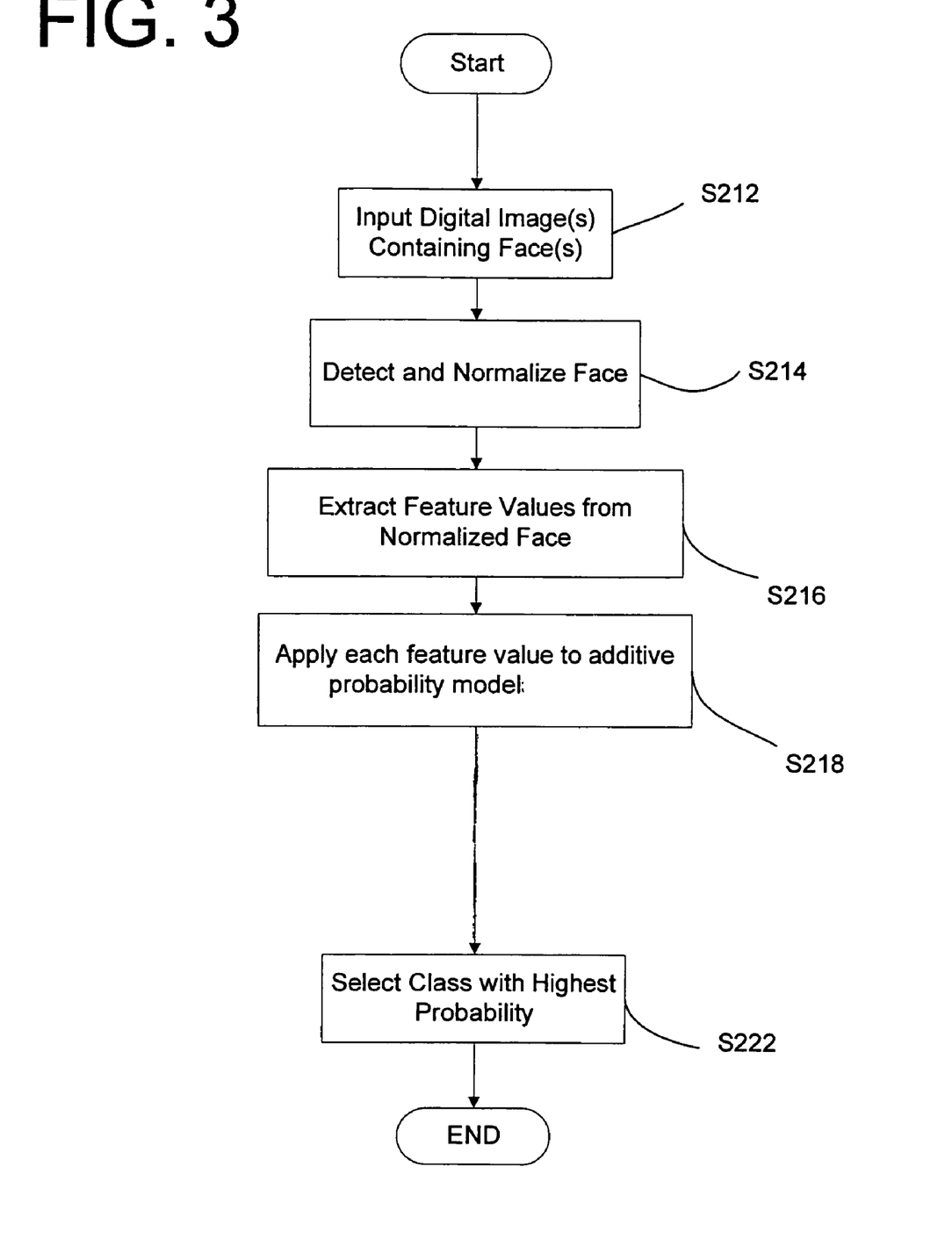
FIG. 3 is a flow diagram illustrating operations performed to classify faces using probability models according to an embodiment of the present invention.
Figure 4:
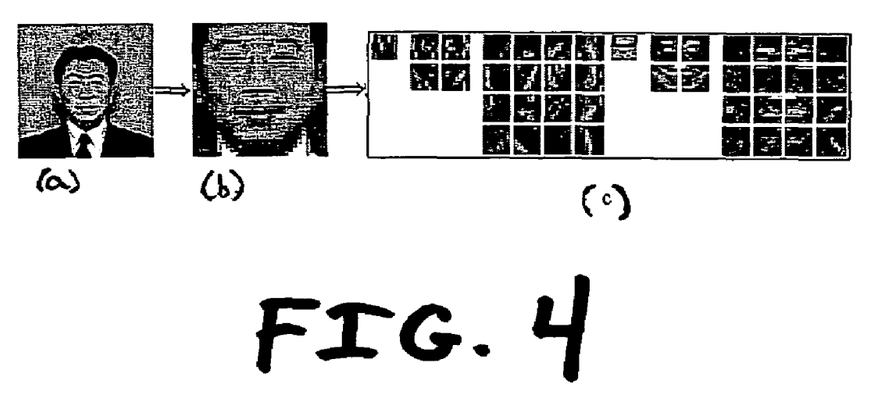
FIG. 4 illustrates face normalizing and feature extraction according to an exemplary implementation of the present invention.

With reference to the flow diagram of FIG. 3, for face recognition, the image processing control unit 38 initially inputs a digital image containing at least one face, e.g., from image memory 32 or directly from the image input device 20 (step S212). Next, the face detection unit 34 receives the digital image data to detect a face in the input digital image (e.g., face (a) in FIG. 4) and the normalizing unit 36 normalizes the face detected by the face detection unit 34 (step S214). An example normalized face is shown as view (b) in FIG. 4. Next, the feature extraction unit 37 extracts features from the normalized face representation that are to be used for recognition (step S216). In one implementation, the extracted features are Discrete Wavelet Transform coefficients. Although various techniques for face detection, normalizing, and feature extraction for recognition are known and may be used by the image processing unit 30, specific techniques for face detection/normalizing and feature extraction are described below with reference to the training stage of the image processing unit 30. The similarity determination unit 39 receives the plurality of feature values extracted by the feature extraction unit 37 and applies these feature values to a previously-determined Additive Gaussian Model for each of a plurality of existing classes (step S218) to determine the likelihood that the normalized face belongs to each of a plurality of existing classes. To determine to which of the existing classes the normalized face belongs, the similarity determination unit 39 selects the class with the highest calculated likelihood value (step S222). Having generally described operation of the image processing components for face recognition in accordance with principles of the present invention, a specific discussion of the Additive Gaussian Model used for face recognition, including a process for deriving an Additive Gaussian Model for faces and training, follows.

Overview

The system in accordance with one aspect of the invention is able to generalize a single view to a model spanning a range of illuminations, expressions, and poses. The system learns, from a training set of faces of a large number of individuals, the features that maximize the separation between people, relative to the variations in the face appearance for one person. The features can be combined into an Additive Gaussian Model so that each feature's contribution depends on its discriminating ability. The Additive Gaussian Model (AGM) allows the system to model both the inter- and intra-class variations in appearance, and can be used to create a model for each individual, spanning a range of variations in pose, expression and illumination, from just one, or a few, examples. Using AGM for recognition provides a powerful method for recognition using even a single example of each face, while allowing multiple examples to be combined in a principled way into a more accurate face model. This model is robust and applies to both frontal and non-frontal faces.

Additive Gaussian Model

To demonstrate the Additive Gaussian Model principles in accordance with the present invention, consider a training data set containing examples from several classes. In the context of face recognition, each class corresponds to a person, and each example in that class is a certain view of that person's face. One implementation of the present invention extracts from training examples a set of discriminative features, learning the models for the inter- and intra-class variations (corresponding to the differences in appearance of different people and different views of the same person, respectively), and combines these models with examples of previously unseen people. Thus, even from a single example of a person, the system can generate a model that spans a range of variations in appearance of that person.

In one implementation, each face is represented as a vector. However, before addressing the multi-variate case, principles of the present invention are described in the context of a simpler case, where each example is represented with a single number.

Figures 5A, 5B:
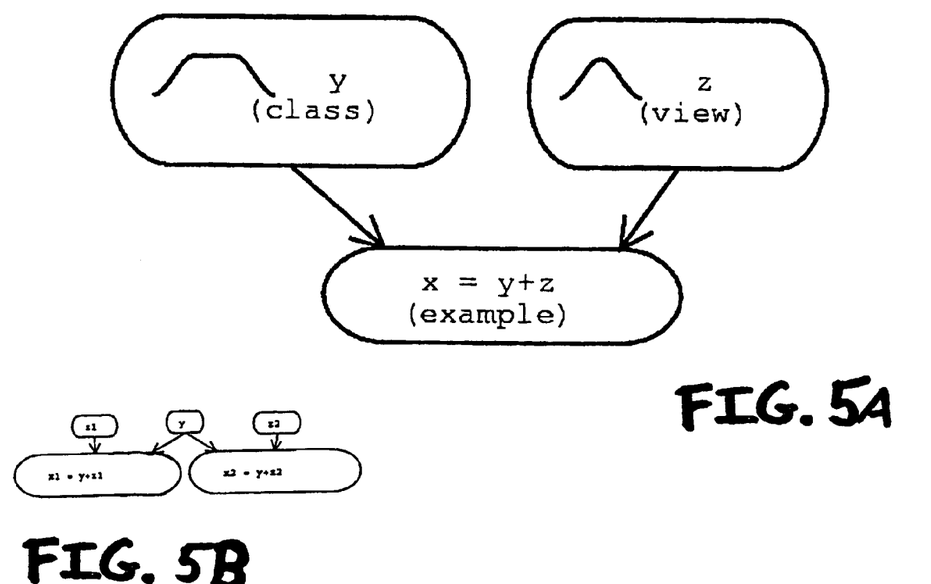
FIG. 5A and FIG. 5B illustrate the concept of the Additive Gaussian Model, which decomposes the appearance of an object into components corresponding to class and view, utilized for recognition/verification in accordance with principles of the present invention.

Initially, it can be assumed that the probability distributions of both the set of all faces, and sets of faces belonging to the same class, are Gaussian. While not generally true, this assumption often holds and in particular applies to the set of discriminative features learned for faces (discussed below). Further, to make the recognition problem tractable and be able to generalize to previously unseen individuals, it can be assumed that the distributions corresponding to different classes have the same variance. Thus, the data can be rescaled so that all within-class distributions have unit variance:

$$P(x|\text{class})=N(x|y,1)$$

where N is a normal distribution and where y is the class center. It is convenient to let z=x−y be the difference between an example and the center of its class; then, z is independent of y (and therefore of x=y+z), and is normal with zero mean and unit variance. Finally, since x and z are assumed to be normal and independent, y is Gaussian as well. Let $\sigma^2$ be its variance, and shift the data to make its mean 0; resulting in $$x=y+z$$

$$P(y)=N(y|0,\sigma^2) \quad (1)$$

$$P(z)=N(z|0,1)$$

where N represents a normal distribution, x is a data sample (appropriately shifted and scaled), y represents the class (e.g., a person, in the case of face recognition) and z the view, i.e., the residual between the sample and its class center. We will call this an Additive Gaussian Model, which is illustrated conceptually in FIGS. 5A-5B. FIG. 5B illustrates the concept of the Additive Gaussian Model for two examples, x1 and x2 of the same classy (e.g., the two images of the same face taken at different times, perhaps even years apart), each having a residual component z1, z2.

As illustrated in FIGS. 5A-5B, the model (1) decomposes the data into components corresponding to content and style. In this approach, each example is associated only with a class label, and not a view label. This is advantageous because the technique does not need to create view labels, and because the technique specifically models the view to factor it out—while treating the class and the view symmetrically would not be optimal for recognition.

This disclosure describes below how an Additive Gaussian Model can be learned—that is, how to rescale and shift the data, find $\sigma$, and separate each example x into the class y and view z to fit the model (1). But first, the following section shows how the AGMs can be used by the image processing unit 30 for recognition.

Face Classification

Consider the multi-class recognition problem, where a novel example input to the image processing unit 30 needs to be assigned into one of the M existing classes (e.g., each corresponding to a different person). It may be assumed that for each class there is a model, represented as a probability distribution P(x|class). Then, to classify the new example x, the similarity determination unit 39 can compute likelihoods $P(x|class_1), \ldots, P(x|class_M)$. Assuming, as model (1) does, that each class i is modeled by a normal distribution with a unit variance and a known mean $y_i$, the likelihoods will be $P(x|class_i)=N(x|y_i, 1)$. To determine to which class the example belongs, the similarity determination unit 39 can simply pick the class with the highest likelihood.

In practice, however, the true mean of the classes is not known. In fact, there often may be only one example per class in the gallery, which cannot provide an accurate estimate of the mean $y_i$. However, with the Additive Gaussian Model this uncertainty can be represented in a model.

More specifically, consider a class for which n examples are available: $x_i \ldots x_n$. It can be assumed that these examples are independently drawn from the distribution N(x|y, 1). Although y is not yet known, the inference can be performed to compute its posterior distribution. This is illustrated conceptually in FIG. 7. According to AGM defined in equation (1), $$P(y|x_1 \ldots x_n) \propto P(y, x_1 \ldots x_n) =$$
$$P(y)P(x_1|y) \ldots P(x_n|y) \propto e^{-\frac{y^2}{2\sigma^2} - \frac{\sum_i (x_i - y)^2}{2}}$$

Figure 7:
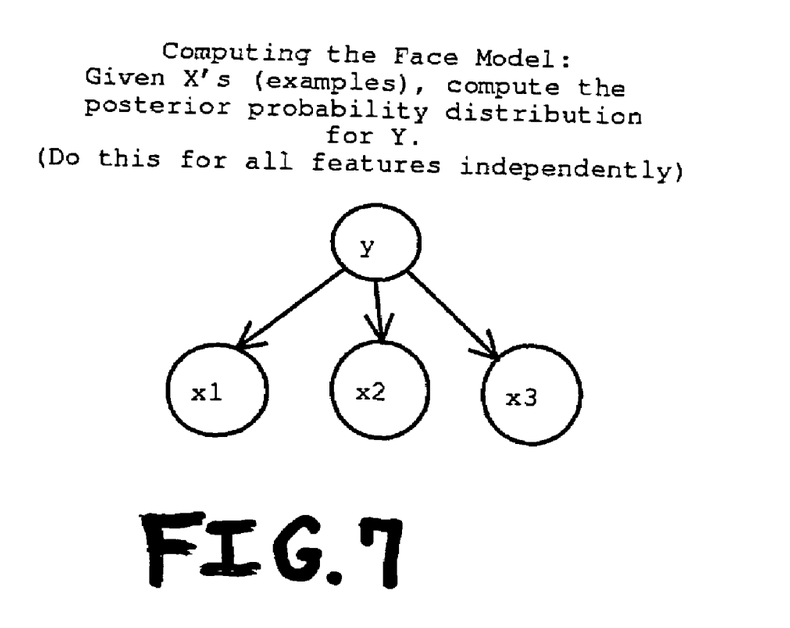
FIG. 7 conceptually illustrates probability distribution calculation for an existing class in accordance with an embodiment of the present application.

It easily follows that the posterior of y is Gaussian, with the mean $$\frac{\sigma^2}{1+n\sigma^2} \sum_i x_i,$$

and variance $$\frac{\sigma^2}{1+n\sigma^2}.$$

As the number n of data points increases, the variance approaches 0, and the mean approaches the sample mean of examples, as would be expected. If only a few examples are available, the conditional variance of y increases, and the mean shifts toward the more noncommittal zero (i.e. the center of all the data).

If a new example x is independently drawn from the same class as $x_1 \ldots x_n$, then x=y+z where P(z)=N(z|0,1). Therefore, the likelihood for x—the probability distribution of observing the example conditional on its containing the same face as each of $x_1 \ldots x_n$—is $$P(x|x_1 \ldots x_n) = N\left(x \left| \frac{\sigma^2}{1+n\sigma^2} \sum_{i=1}^{n} x_i, 1 + \frac{\sigma^2}{1+n\sigma^2} \right.\right) \quad (2)$$

If several groups of examples are present, each corresponding to a particular class, then it can be determined for a novel example to which class it is most likely to belong, by maximizing the likelihood (which can be weighted by the class priors if desired).

Comparing Two Sets of Faces

Consider two clusters of examples, such that in each cluster all the examples are of the same person. The goal is to determine whether the two clusters actually contain examples of the same person.

This problem has several applications. One is verification where an individual states who he is, and the system 100 verifies that by matching his face against that stored in a database (for example in image memory 32). Another is image organization, where faces are grouped into a small set of clusters by starting with a single face per cluster, and then merging clusters until their number has been sufficiently reduced. By clustering similar images together, the browsing of image collections can be facilitated, as described for example in the co-pending application titled "Method and Apparatus for Organizing Digital Media Based on Face Recognition" and filed concurrently herewith, which is herein incorporated by reference.

Let each of the two clusters i=1, 2 contain $n_i$ examples $x_{i1}, \ldots, x_{in_i}$ of one person. The system can determine whether the two people represented by the clusters are the same by computing the log-likelihoods $$L_1 = \log P(x_{11} \ldots x_{1n_1}, x_{21} \ldots x_{2n_2} | \text{same person in both clusters})$$

$$L_0 = \log P(x_{11} \ldots x_{1n_1}, x_{21} \ldots x_{2n_2} | \text{same person within each cluster})$$

where $L_1$ corresponds to the case where the two clusters match, and $L_0$ corresponds to the general case where they may or may not match. The posterior probability that the two clusters contain the same face is a monotonically increasing function of $L_1-L_0$; therefore, if the difference $L_1-L_0$ is above a threshold, the system can decide that the two clusters represent the same person. The threshold can be adjusted to move along the ROC (receiver operating characteristic) curve, trading off false positives and false negatives.

To compute $L_1$ and $L_0$, the cluster log-likelihood can be defined to be the log-probability of seeing a set of examples in random views of one person:

$$L(x_1, \ldots, x_n) = \log P(x_1, \ldots, x_n | \text{same class})$$

Then, the value computed to determine whether the two clusters match is $$L_1 - L_0 = L(x_{11} \ldots x_{1n_1}, x_{21} \ldots x_{2n_2}) - L(x_{11} \ldots x_{1n_1}) - L(x_{21} \ldots x_{2n_2}) \quad (3)$$

Using the fact that $P(y)=N(y|0,\sigma^2)$ and $P(x|y)=N(x|y, 1)$, we compute $$P(x_1, \ldots, x_n | \text{same class}) = \int P(x_1 | y) \ldots P(x_n | y) P(y) dy$$

$$= \frac{e^{-\frac{q}{2} + \frac{s^2 \sigma^2}{2(n\sigma^2 + 1)}}}{(2\pi)^{n/2} \sqrt{n\sigma^2 + 1}}$$

where $s = x_1 + \ldots + x_n$ and $q = x_1^2 + \ldots + x_n^2$. Taking the logarithm, the cluster log-likelihood is represented as:

$$\mathcal{L}(x_1, \ldots, z_n) = -\frac{n \log(2\pi) + q}{2} + \frac{s^2 \sigma^2}{2(n\sigma^2 + 1)} - \frac{\log(n\sigma^2 + 1)}{2}$$

which can be plugged into equation (3) to determine whether two clusters match. In practice, q does not have to be computed, as it gets canceled in equation (3).

Cluster matching is an alternative way of deriving the method described above for determining to which of the existing clusters to assign a novel example. Each of the existing clusters is matched against the cluster containing just the novel example using equation (3), and the example is assigned to the cluster for which the value $L_1-L_0$ is maximized. Additionally, we can assign the example to the "outlier" class if the maximum value of $L_1-L_0$ is too low.

For image organization, equation (3) can be used in agglomerative clustering, where there is initially a single image per cluster, and then an operation is performed to sequentially merge pairs of clusters. It can be easily seen that if a goal is to find a set of clusters that maximize the likelihood of the set of faces, and a greedy method is used to do this, then the pair of clusters merged at each step should be the one for which the difference $L_1-L_0$ is maximized Merging is complete when either $L_1-L_0$ is too small, or when the desired number of clusters have been obtained.

Just as the entire set of images can be clustered into groups (perhaps to facilitate browsing and labeling), this can be done for a set of faces labeled as a particular person. This is done using agglomerative clustering, mentioned above. A different method can be used for clustering, such as Expectation Maximization (EM), but the end result is the separation of faces of the same person into groups. This gives rise to a mixture model: the probability distribution for the particular individual is not a single (Gaussian) model based on all the labeled faces, but a mixture model, with a separate Gaussian model for each cluster. To compute the score (or probability) for a face against the mixture model, similarity scores are computed against each mixture component, and combined to obtain a single score; the simplest way to do this is by taking the maximum.

For example, given some faces of a person when he was 5 years old and some when he was 10, clustering into 2 groups might separate the different-age faces. A Gaussian model can be computed from each cluster using the method described above. To sort the remaining faces, it is possible to compute the score for each face against both models and take the maximum of the two; the resulting score is then used for sorting.

Learning the Model Parameters

So far, it has been assumed that an example x is represented as $x = y + z$ where $P(y) = N(y|0,\sigma^2)$ and $P(z) = N(0,1)$. Such representation does not result in loss of generality because the data can be shifted as necessary to make y and z have zero mean, and the data can be scaled to make z have unit variance. However, to do this each example x must be separated into the class variable y and the view variable z, such that $$x = y + z, \; P(y) = N(y|m, u), \text{ and } P(z) = N(z|0, v).$$

Consider a set of examples from k classes, with $n_i$ examples $x_{i1} \ldots x_{in_i}$ provided for ith class. The system is to solve a likelihood maximization problem with missing variables, the cluster center $y_1 \ldots y_k$. The system must determine the mean m and the variances u and v, as well as the missing variables, that maximize the complete likelihood $$P(\{y_i\}, \{x_{ij}\}) = \prod_{i=1}^{k} \mathcal{N}(y_i | m, u) \prod_{j=1}^{n_i} \mathcal{N}(x_{ij} | y_i, v) \quad (4)$$

Since there is a need to optimize this complete-data likelihood over both the missing variables $\{y_i\}$ and the parameters m, u, v, it is natural to use the Expectation-Maximization method, which is described for example in C. Bishop, *Neural networks for pattern recognition*, Oxford University Press, 1995, which is hereby incorporated by reference.

In the Expectation (E) step, the system derives, from the complete-data likelihood (4), the distributions of the missing variables $y_1 \ldots yk$ conditional on the data $\{x_{ij}\}$ and the current estimates of the parameters m, u, v. It can be seen that $y_i$'s conditional distribution is Gaussian, with the mean and the variance $$\bar{y}_i = \frac{\left(\sum_{j=1}^{n_i} x_{ij}\right) u + mv}{n_i u + v}$$

$$\text{Var}[y_i] = \frac{uv}{n_i u + v}$$

To complete the E-step, the expected complete log-likelihood is computed, with respect to the conditional distributions $\overline{P}(y_i|\{x_{ij}\},m,u,v)=N(y_i|\overline{y_i},\mathrm{Var}[y_i])$:

$$E_{y_1\ldots y_k}[\log P(\{y_i\},\{x_{ij}\})] = -\frac{k\log u}{2} + \sum_{i=1}^{k}$$

$$\left(-\frac{(\overline{y_i}-m)^2+\mathrm{Var}[y_i]}{2u} - \frac{n_i\log v}{2} - \sum_{j=1}^{n_i}\frac{(x_{ij}-\overline{y_i})^2+\mathrm{Var}[y_i]}{2v}\right)$$

where a constant additive term is omitted for brevity.

In the Maximization (M) step, the values of m, u, v that maximize the expected complete log-likelihood are found, by setting the corresponding derivatives to zero. This results in $$m = \frac{\sum_{i=1}^{k}\overline{y_i}}{k}$$

$$u = \frac{\sum_{i=1}^{k}(\overline{y_i}-m)^2+\mathrm{Var}[y_i]}{k}$$

$$v = \frac{\sum_{i=1}^{k}\sum_{j=1}^{n_i}(x_{ij}-\overline{y_i})^2+\mathrm{Var}[y_i]}{\sum_{i=1}^{k}n_i}$$

By iterating between the E-step and M-step, the optimal values of m, u, v converge. Finally, each example x is replaced with $(x-m)/\sqrt{v}$ and set $\sigma=\sqrt{u/v}$, thereby achieving the desired additive model (1).

Multivariate Case

In practice, faces or other objects will be represented by more than a single number. The previous analysis has dealt with univariate case, and needs to be generalized to multiple dimensions. This problem can be significantly simplified by assuming variable independence. In other words, it can be assumed that each example has the form $(x_{(1)}\ldots x_{(D)})$, where D is the number of dimensions, and $x_{(j)}=y_{(j)}+z_{(j)}$, $j=1\ldots D$, where $(y_{(1)}\ldots y_{(D)})$ represent the class (individual), $(z_{(1)}\ldots z_{(D)})$ represent the view of the object within its class, and all the $y_{(j)}$ and $z_{(j)}$ are mutually independent. These variables have distributions $P(z_{(j)})=N(z_{(j)}|0,1)$ and $P(y_{(j)})=N(y_{(j)}|0,\sigma^2_{(j)})$; each variable can be rescaled independently to make its within-class variance 1, but different variables have different class-center variances, $\sigma^2_{(j)}$, with larger $\sigma_{(j)}$ corresponding to the more discriminative variables. Under the independence assumption, the likelihoods corresponding to the individual variables can simply be multiplied; all the other quantities used in the analysis will be similarly affected.

For example, consider equation (2), which was used to compute the likelihood of a new example belonging to the same class as the n known examples—and thus determine to which of the known individuals the new example corresponds. In the multi-variate case, the novel example is a vector $x=(x_{(1)}\ldots x_{(D)})$, and each of the known examples is a vector $x_i=(x_{i(1)}\ldots x_{i(D)})$, $i=1\ldots n$. Because of the variable independence assumption, equation (2) is transformed to the multivariate case as follows:

$$P(x|x_{(1)}\ldots x_n) = \prod_{j=1}^{D}N\left(x_{(j)}\left|\frac{\sigma^2_{(j)}}{1+n\sigma^2_{(j)}}\sum_{i=1}^{n}x_{i(j)}, 1+\frac{\sigma^2_{(j)}}{1+n\sigma^2_{(j)}}\right.\right) \quad (5)$$

Implementing a Face Recognition System using AGM

In the Additive Gaussian Model described so far, it has been assumed that the data may be represented with a fixed number of independent and roughly Gaussian variables. In the following section, it is described how such a representation can be derived for faces. This technique will be described with reference to the flow diagram of FIG. 6, which shows a training sequence for the elements of the image processing unit 30.

Detecting Faces

The image processing unit 30 may analyze the entire face image, rather than individual facial features. Therefore, to compare two faces, the normalizing unit 36 should normalize them so that they are the same size, with corresponding points on the two faces occupying roughly the same locations in the images. First, with reference to the flow diagram of FIG. 6, an image is input (step S302) and the face detection unit 34 extracts faces from the image (step S304A). Then, the normalizing unit 36 receives the isolated face (step S306) and detects face feature points (step S308A) (e.g., the eyes and the corners and center of the mouth) for each face, for example using trained detectors. The normalizing unit 36 computes a similarity transformation that maps the detected feature points as close as possible to their canonical positions (step S312) to output a normalized face (step S314). Applying such transformation ("warping") to each face normalizes the faces and ensures that corresponding pixels in the images correspond to similar facial features.

Figure 6:
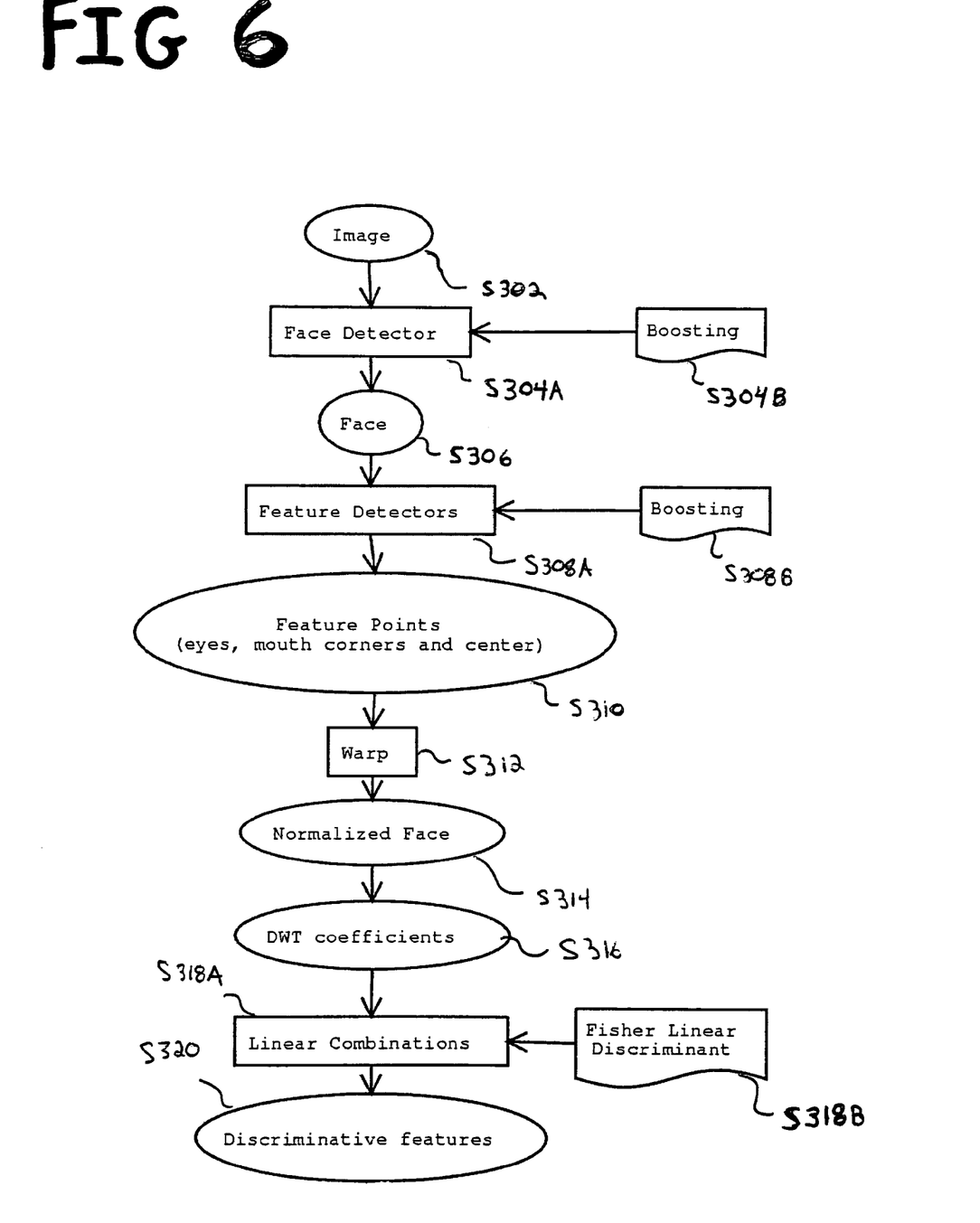
FIG. 6 is a flow diagram illustrating a training operation for determining discriminating features for object recognition/verification in accordance with an embodiment of the present invention.

In one implementation, the face detection unit 34 is trained using boosting (step S304B) and uses quantized Discrete Wavelet Transform coefficients to represent a face. Such a technique for face detection, with boosting, is described in U.S. application Ser. No. 10/440,173, titled "Method and Apparatus for Red-Eye Detection," which is incorporated by reference herein. The detectors for each of the facial features may be similarly trained (step S308B), e.g., from a set of image patches centered at manually marked face feature locations in training face images (different from the images used to train the Face Recognition module). Having detected the features in a face (e.g., eyes and the corners and center of the mouth), these feature points (step S310) are used by the normalizing unit 36 to determine the rotation, translation and scale that maps the features as close as possible to some canonical positions, in the least-squares sense. Thus, the normalizing unit 36 warps the face to a fixed size, with the features at roughly the canonical places (step S312). In one example implementation, each face is transformed into a 32×32 gray-scale image. In addition to the geometric normalization, the normalizing unit 36 may normalize the image contrast by dividing each pixel by a standard deviation of the pixels around it, thus reducing the influence of varying illumination.

The face detection unit 34 may detect eyes, etc. as follows. Initially, training examples (positive and negative) can be represented as using a set of discrete features (e.g., combinations of Discrete Wavelet Transform coefficients). For each feature, the face detection unit 34 computes the probability distributions (represented as histograms) for positive as well as negative images, and divides one histogram by the other to get, for each feature, a table containing the values of the likelihood ratio $$P(feature|eye)$$

$$P(feature|non-eye)$$

Assuming feature independence (this assumption is in fact incorrect, but this can be ignored), the face detection unit 34 computes the degree of eye-likeness for each candidate image patch by computing all the DWT-based features, looking up the corresponding likelihood ratios, and multiplying them together. The patch is considered to be an eye if the resulting score is sufficiently high; also, the maximum of this score in a region where a search is conducted for an eye can be selected (i.e., localize by picking the highest-scoring location). This is similar to the face detection method described in S. Ioffe, Automatic Red-Eye Reduction, In *Proc. Int. Conf. Image Processing*, 2003, which is herein incorporated by reference.

In practice, this method would be slow because each feature needs to be evaluated for each image patch, and the number of features per patch is high (e.g., several 1000's). To overcome this problem, the face detection unit 34 may utilize early rejection. Using the training images, the features are sorted in such a way that, fixing the acceptance rate (e.g., 99%) each feature allows the system to reject the largest number of non-eye patches. In addition to ordering the features, the system computes a set of intermediate thresholds, so that during the evaluation of a candidate patch in detection, the face detection unit 34 goes through the features in the order determined during learning, looks up the corresponding likelihood ratios and adds them to the cumulative sum. After evaluating each feature, this cumulative sum is compared with the corresponding threshold (determined during training), and the candidate is rejected if the sum is below the threshold.

Having obtained the facial features, the normalizing unit 36 can compute the affine transform mapping such facial features as close as possible to certain canonical locations using known techniques. Same for warping the face using the transform.

The face representation should capture the features at multiple scales and orientation. In one embodiment, the normalized face image is provided to the feature extraction unit 37 (step S314), which computes the Discrete Wavelet Transform (step S316). The technique described in S. Ioffe, Automatic Red-Eye Reduction, In *Proc. Int. Conf. Image Processing*, 2003, may be followed and the over complete DWT may be used, recording each level of the transform before it is sub-sampled. In one implementation, the feature extraction unit 37 computes DWT, using Haar basis, at 3 scales and discard the HH component, so that the resulting features emphasize horizontal and vertical edges. For each of the two edge orientations a 32×32 matrix of responses at the finest scale may be obtained, and 16×16 and 8×8 matrices at the next two scales. In addition, performance may be improved if a non-linearity is introduced and each DWT coefficient c is separated into a positive and a negative channels $c_+ = \max(c,0)$ and $c_- = \min(c,0)$. Now each face is represented by 5376 DWT coefficients at 3 scales, 2 orientations, and 2 channels.

Learning the Model

The multi-dimensional Additive Gaussian Model, described above, assumes variable independence—the property that the overcomplete DWT lacks. Therefore, before applying the model (1), the system should extract features that are independent; furthermore, these features should be as good as possible at discriminating between classes. Fisher Linear Discriminant (FLD), such as described in such as described in C. Bishop, *Neural networks for pattern recognition*, Oxford University Press, 1995, may be used for this purpose. Linear combinations of the features that have a high between-class variance and low within-class variance are found, by computing the between-class and within-class covariance matrices $S_b$ and $S_w$, and solving a generalized eigen-problem $S_b v = \lambda S_w v$. The optimal projections of the features are given by the eigenvectors corresponding to the highest eigenvalues.

However, dealing with the 5376-dimensional data, it is difficult to estimate the co-variance matrices. Another problem is that there cannot be more eigenvectors than there are classes in the training set. These problems may be circumvented, and better performance achieved, by computing the linear transformation not for the entire set of features, but for blocks of features, grouped together according to their position and scale. For each of the 21 feature blocks (shown for example in view (c) of FIG. 4), the FLD (step S318B) may be used to find the best 50 linear combinations of DWT coefficients (step S318A); of the resulting 1050 projections, the 600 corresponding to the highest eigenvalues are kept (step S320). The resulting features are empirically analyzed by computing their correlations and looking at the feature histograms, indicating that they are in fact Gaussian and independent, and thus lend themselves to the Additive Gaussian Model. Each of the 600 features may be rescaled, and the corresponding cluster-center variances $\sigma^2$ computed, using the method outlined above. In this way, probability distributions are calculated for each feature (step S322). The contributions of different features are then combined as described above. It should be recognized that the number and type of features extracted by the feature extraction unit 37 may vary.

Face Verification

Figure 8:
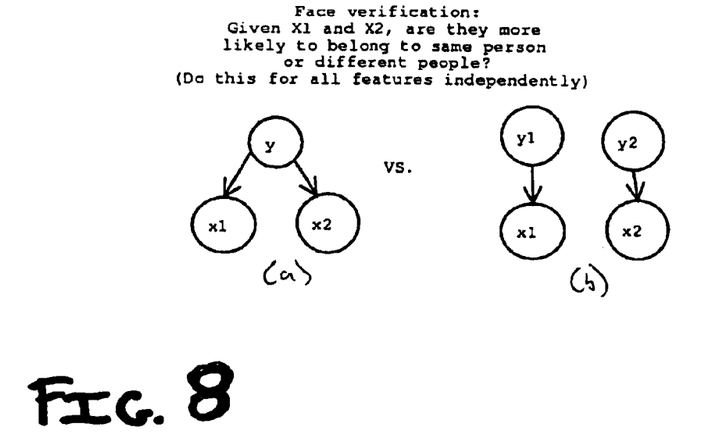
FIG. 8 conceptually illustrates object verification in accordance with an embodiment of the present invention.

The above-described techniques may also be used for face verification, for example as a way to prevent impostors from gaining access they are not allowed to have. When a person states his identity, the image processing unit may compare his face to the view(s) stored in the gallery for that identity, and a decision may be made as to whether the person is who he says he is. Depending on the application, the system may be more willing to tolerate False Positives (false acceptance) or False Negatives (false rejection). Therefore, the best way to represent verification performance is with a ROC curve, showing both the False Positive and the False Negative rates. To move along the curve, the threshold with which the "match score" (equation (3)) is compared may be changed. Face verification is illustrated conceptually in FIG. 8. As shown in FIG. 8, the image processing unit 30 may perform face verification by determining whether, given examples x1 and x2, they are more likely to belong to the same person (view (a) in FIG. 8) or different people (view (b) in FIG. 8). This may be determined for each extracted feature independently.

Although detailed embodiments and implementations of the present invention have been described above, it should be apparent that various modifications are possible without departing from the spirit and scope of the present invention.

I claim:

1. A method for automatically recognizing or verifying objects in a digital image, said method comprising:

accessing digital image data containing an object of interest therein;

using at least one processor for detecting an object of interest in said digital image data of interest in said digital image data;

normalizing said object of interest to generate a normalized object representation;

extracting a plurality of features from said normalized object representation; and applying each extracted feature to a previously-determined additive probability model to determine the likelihood that the object of interest belongs to an existing class of objects, wherein said additive probability model models the objects using a class center and residual components between the objects and the class center, wherein an uncertainty related to the class center is represented by a model associated with the class center, wherein said object of interest is a face and said step of detecting the object of interest detects facial features in said digital image data.

2. The method according to claim 1, wherein said previously-determined additive probability model is an Additive Gaussian Model that decomposes an appearance of an object into components corresponding to class and view.

3. The method according to claim 1, further comprising:
selecting the existing class for said object of interest based on said likelihood; and
re-calculating the additive probability model for the selected class using a feature value of the object of interest.

4. The method according to claim 1, wherein said step of detecting the object of interest utilizes early rejection to determine that an image region does not correspond to a facial feature.

5. The method according to claim 1, wherein said object of interest is a face in a digital photo.

6. The method according to claim 1, further comprising:
generating an additive probability model for each of a plurality of classes based on feature values for objects belonging to said classes.

7. The method according to claim 6, wherein said step of generating the additive probability model for a particular class is repeated each time a detected object of interest is added to the corresponding class.

8. The method according to claim 6, wherein said step of generating the additive probability model clusters examples belonging to a single class so as to generate multiple additive probability models for each class identity.

9. The method according to claim 6, wherein said step of generating the additive probability model computes a posterior distribution for a feature value mean from at least one example feature value.

10. The method according to claim 9, wherein said additive probability model models variance of said feature value mean.

11. The method according to claim 10, wherein said variance of said feature value mean approaches zero as more examples are associated with the corresponding class.

12. The method according to claim 1, further comprising:
executing a training stage to identify a set of independent features that discriminate between classes.

13. The method according to claim 1, wherein said digital image data represents a digital photo.

14. An apparatus for automatically recognizing or verifying objects in a digital image, said apparatus comprising:
a digital image data input for accessing digital image data containing an object of interest therein;
an object detector for detecting an object of interest in said digital image data;
a normalizing unit for normalizing said object of interest to generate a normalized object representation;
a feature extracting unit for extracting a plurality of features from said normalized object representation; and
a likelihood determining unit for applying each extracted feature to a previously-determined additive probability model to determine the likelihood that the object of interest belongs to an existing class of objects,
wherein said additive probability model models the objects using a class center and residual components between the objects and the class center, wherein an uncertainty related to the class center is represented by a model associated with the class center, and
wherein said object of interest is a face and said object detector for detecting an object of interest detects facial features in said digital image data.

15. The apparatus according to claim 14, wherein said previously-determined additive probability model is an Additive Gaussian Model that decomposes an appearance of an object into components corresponding to class and view.

16. The apparatus according to claim 14, wherein said likelihood determining unit selects the existing class for said object of interest based on said likelihood; and re-calculates the additive probability model for the selected class using a feature value of the classified object of interest.

17. The apparatus according to claim 14, wherein said object detector detects the object of interest utilizing early rejection to determine that an image region does not correspond to a facial feature.

18. The apparatus according to claim 14, wherein said object of interest is a face in a digital photo.

19. The apparatus according to claim 14, wherein said apparatus generates an additive probability model for each of a plurality of classes based on feature values for objects belonging to said classes.

20. The apparatus according to claim 19, wherein said apparatus repeats generating the additive probability model for a particular class each time a detected object of interest is added to the corresponding class.

21. The apparatus according to claim 19, wherein said apparatus generates the additive probability model by clustering examples belonging to a single class so as to generate multiple additive probability models for each class identity.

22. The apparatus according to claim 19, wherein said apparatus generates the additive probability model by computing a posterior distribution for a feature value mean from at least one example feature value.

23. The apparatus according to claim 22, wherein said additive probability model models variance of said feature value mean.

24. The apparatus according to claim 23, wherein said variance of said feature value mean approaches zero as more examples are associated with the corresponding class.

25. The apparatus according to claim 14, wherein said apparatus executes a training stage to identify a set of independent features that discriminate between classes.

26. The apparatus according to claim 14, wherein said digital image data represents a digital photo.

* * * * *